United States Patent [19]
Kanamori

[11] Patent Number: 6,167,565
[45] Date of Patent: Dec. 26, 2000

[54] METHOD AND SYSTEM OF CUSTOM MARSHALING OF INTER-LANGUAGE PARAMETERS

[75] Inventor: Atsushi Kanamori, Redmond, Wash.

[73] Assignee: Microsoft Corporation, Redmond, Wash.

[21] Appl. No.: 09/004,219

[22] Filed: Jan. 8, 1998

[51] Int. Cl.[7] ........................................... G06F 9/44
[52] U.S. Cl. .................. 717/5; 709/1; 709/203; 709/304; 709/201; 707/103
[58] Field of Search ............... 709/1, 300, 304, 709/303, 203; 707/103; 717/5

[56] References Cited

U.S. PATENT DOCUMENTS

| | | | |
|---|---|---|---|
| 5,377,350 | 12/1994 | Skinner ................................. | 709/304 |
| 5,511,197 | 4/1996 | Hill et al. ............................. | 395/700 |
| 5,524,253 | 6/1996 | Pham et al. ....................... | 395/500.48 |
| 5,566,302 | 10/1996 | Khalidi et al. ....................... | 709/300 |
| 5,577,251 | 11/1996 | Hamilton et al. ..................... | 709/203 |
| 5,737,607 | 4/1998 | Hamilton et al. ..................... | 395/701 |
| 5,758,186 | 5/1998 | Hamilton et al. ..................... | 710/11 |
| 5,761,499 | 6/1998 | Sonderegger ......................... | 707/10 |
| 5,875,335 | 2/1999 | Beard ................................. | 395/705 |
| 5,881,230 | 3/1999 | Christensen et al. .................. | 709/203 |
| 5,887,172 | 3/1999 | Vasudevan et al. .................... | 709/304 |
| 5,911,069 | 6/1999 | Beard ................................. | 709/303 |
| 5,920,720 | 7/1999 | Toutonghi et al. .................... | 395/705 |
| 5,960,200 | 9/1999 | Eager et al. .......................... | 395/705 |
| 5,991,823 | 11/1999 | Cavanaugh, III et al. ............. | 709/304 |
| 5,995,974 | 11/1999 | Anton et al. .......................... | 707/103 |
| 5,999,986 | 12/1999 | McCauley, III et al. ............... | 709/300 |
| 5,999,988 | 12/1999 | Pelegri-Llopart et al. ............. | 709/304 |
| 6,006,235 | 12/1999 | Macdonald et al. ................... | 707/103 |
| 6,009,464 | 12/1999 | Hamilton et al. ..................... | 709/219 |
| 6,016,489 | 1/2000 | Cavanaugh et al. ................... | 707/8 |

OTHER PUBLICATIONS

"Type Mappings Between Java and COM . . . " http://www.microsoft.comjava/sdk/20/jnativeType_Mappings_Between_Java_and_COM.htm.

"Introduction to Java/COM Custom Marshaling for User–Defined Data Types." http://www.mirosoft.com/java/sdk/20/tools/marshal.htm.

*Primary Examiner*—Kevin J. Teska
*Assistant Examiner*—William D. Thomson
*Attorney, Agent, or Firm*—Klarquist Sparkman Campbell Leigh & Whinston, LLP

[57] ABSTRACT

A computer-based custom marshaling method and system for custom marshaling of parameters during invocation of functions implemented in a second language by computer programs implemented in an first language. The parameter to be custom marshaled has a first type in the first language and a second type in the second language. The custom marshaling system receives code for converting a parameter of the first type to a parameter of the second type and for converting a parameter of the second type to a parameter of the first type. The custom marshaling system monitors the execution of a computer program implemented in the first language that invokes a function implemented in the second language. The invocation passes a parameter of the first type, and the function expects a parameter of the second type. The custom marshaling system intercepts the invocation of the function implemented in the second language. After intercepting the invocation, the custom marshaling system executes the received code for converting the passed parameter of the first type to a parameter of the second type. The custom marshaling system then invokes the function implemented in the second language passing the parameter converted to the second type. The invoked function returns a parameter of the second type. After invocation of the function, the custom marshaling system executes the received code for converting the returned parameter of the second type to a parameter of the first type and returns the converted parameter of the first type when returning from the intercepted invocation of the function.

19 Claims, 5 Drawing Sheets

METHOD AND SYSTEM OF CUSTOM MARSHALING OF INTER-LANGUAGE PARAMETERS

TECHNICAL FIELD

This invention relates generally to a computer system and method for passing data and, more specifically, for a method and system for passing parameters when invoking a function.

BACKGROUND OF THE INVENTION

Computer software systems can be very complex systems in which the same sequence of instructions may be executed multiple times. For example, a computer program may provide a window area that contains the contents of a bitmap. As the computer program executes, it may enter various states in which contents of different bitmaps should be displayed. Thus, the computer program may repeatedly execute the same sequence of instructions needed to redisplay the contents of a bitmap. A computer program could simply contain a copy of this sequence of instructions in various places throughout the computer program at the point at which the contents of different bitmaps are to be displayed. However, such copies of the same instructions have problems in that computer program memory needs memory to store the copies and a programmer may need to develop and debug each copy separately.

Most programming languages and computer instruction sets support the concept of a function (i.e., subroutine) to help alleviate these problems. A function is a sequence of instructions that can be executed at various times throughout execution of the computer program. However, rather than copying the sequence of instructions at various places throughout the computer program, wherever the sequence instructions should be copied a function invocation instruction is placed instead. The execution of the invocation instruction causes the instructions of the function to be executed, and after completing the execution of those instructions, the instructions after the invocation instruction are executed. The net effect is that the instructions are executed in the same sequence as if they had been copied in place of the invocation instruction. Since the invoking program may want to execute the same sequence of instructions but operate on different data (e.g., different bitmaps), parameters can be passed to functions. For example, in the case of a function that displays a bitmap, one parameter could be the bitmap that is to be displayed. Thus, at various points of the computer program the display bitmap function can be invoked, passing the particular bitmap that is to be displayed at that point during the execution of the computer program.

When a programmer develops functions, the programmer defines the number, types, and order of parameters that are to be passed to the function when invoked. For example, the function to display a bitmap may be passed three parameters: a pointer to the bitmap, an integer indicating the number of columns in the bitmap, and an integer indicating the number of rows in the is bitmap. The definition of the number, type, and order of parameters to be passed to a function is provided by the "prototype" of the function. The following statement is an example prototype for the function to display a bitmap.

DisplayBitmap (bitmap*ptr, int rows, int columns)

The invoking program needs the same number, type, and order of parameters as specified in the prototype. To pass the parameters, the invoking program needs to store the parameters at a location where the invoked function can retrieve the parameters. For example, the parameters may be stored on the top of stack by the invoking program. The function can then use the stack pointer to locate and retrieve the parameters. For this example prototype, the invoking program stores a pointer to the bitmap to be displayed onto the stack, followed by integers indicating the number of rows and columns. Translators (e.g., compilers or interpreters) for a programming language generally use a predefined convention for storing parameters to be passed to a function. For example, one convention is that all parameters are passed via the stack in the same order as they appear in the prototype. The use of a passing convention allows a program compiled by one compiler to invoke a function compiled by another compiler, and the parameters will be correctly passed.

Parameters can be passed either by "value" or by "reference." When a parameter is passed by value, the value of the actual parameter is stored in the stack. (The term "formal" parameter refers to the parameter name that is used in the prototype (e.g., "ptr") and that name is used to reference the parameter in the function. The term "actual" parameter refers to the variable that is actually passed when the function is invoked.) When a parameter is passed by reference, the address of the actual parameter is stored in the stack. The prototype for the DisplayBitmap function indicates that the bitmap is passed by reference and that the number of rows and columns are passed by value. The prototype for a function needs to specify (explicitly or implicitly) whether each parameter is passed by value or reference. In the C++ programming language, an asterisk ("*") appended to the name of a type in the declaration of a parameter indicates that the parameter is a reference to a value of that type, rather than the value of that type. For example, the declaration "bitmap* ptr" indicates that the parameter "ptr" is a reference to a bitmap, whereas the declaration "bitmap bm" would indicate that the parameter "bm" is a bitmap. When a parameter is passed by value, the function cannot modify the actual argument itself Conversely, when a parameter is passed by reference, then the functions can use the address to modify the actual argument itself Thus, parameters are typically passed by value when the function does not modify the parameter and by reference when the function modifies the parameter.

Certain programming languages have been developed which are well suited to implementing software systems in certain application domains. For example, the Java programming language was developed explicitly to support the implementation of computer programs that are hardware independent. The Java programming language also defines a set of primitive data types (e.g., integers), object data types, and a convention for passing parameters. In particular, all parameters that have a primitive type are passed by value and that are objects are passed by reference. Although virtually any computer program can be developed using the Java programming language, it may be easier to develop certain portions of the computer program using another programming language (e.g., the C++ programming language). In general, it may be desirable to intermix the programming languages used to develop a computer program for several reasons. First, it may be more efficient to implement a portion of the computer program using one programming language rather than another. Second, it may be that various functions have already been implemented in one programming language, and it would be costly to reimplement the function in another programming language. However, the programming languages may not support the same primitive data types and thus, the types of the parameters may not be fully compatible. For example, a date type in one programming language may be defined in a MM/DD/YY format, while the date type in another programming language may be defined in a YY/MM/DD format.

Some programming language translators have been developed to map the data types of one programming language to the data types of another programming language when a function implemented in one programming language is invoked by a computer program implemented in another programming language. The converting and passing of a parameter is referred to as "marshaling" the parameter. For example, the translator may detect that a function developed in another programming language is to be invoked and that the date types are not compatible. The translator may convert the date parameter to the format expected by the function before invoking the function and convert the date parameter to the format expected by the invoking program upon return from the function. However, the translator can only convert between types for which it happens to have predefined marshaling code. If a programmer defines a complex data type, then the translator is unlikely to be able to perform the needed conversions automatically.

SUMMARY OF THE INVENTION

An embodiment of the present invention provides a method and system for custom marshaling of parameters for inter-language invocation of functions between a first language and a second language. The parameters to be custom marshaled have a first type in the first language and a second type in the second language. The custom marshaling system receives code (e.g., methods of a custom marshaling object) for converting a parameter of the first type to a parameter of the second type and for converting a parameter of the second type to a parameter of the first type. When a computer program implemented in the first language invokes a function implemented in the second language, the custom marshaling system executes the received code for converting the passed parameter of the first type to a parameter of the second type. The custom marshaling system then invokes the function implemented in the second language passing the parameter converted to the second type. After invocation of the function, the custom marshaling system executes the received code for converting the parameter of the second type to a parameter of the first type.

DETAILED DESCRIPTION OF THE INVENTION

An embodiment of the present invention provides a method and system for custom marshaling of parameters during the invocations of functions implemented in one programming language by programs implemented in another programming language. Such invocations are referred to as "inter-language" invocations. The custom marshaling system permits a programmer to provide to the translator a mapping from a data type in one programming language to a corresponding data type in another programming language. This mapping specifies custom marshaling code (i.e., a set of instructions) that can be used for converting parameters of that data type to a parameter of the corresponding data type, and vice versa. The custom marshaling system maps the prototype of the function to be invoked into a prototype that is usable by the invoking program. During execution of the computer program, when the inter-language invocation is encountered, the translator retrieves the specified custom marshaling code for the parameter and executes that code to convert the actual parameter into the data type of the formal parameter. The translator then invokes the function. Upon returning from the function, the translator invokes the custom marshaling code to convert the formal parameter back into the data type of the actual parameter. In this way, a programmer can provide to the translator custom marshaling code to support marshaling of parameters of any data type, and marshaling is thus not limited to only those data types for which the translator happens to have predefined marshaling code.

In one embodiment, the custom marshaling system of the present invention allows programs developed in the Java programming language to invoke programs developed in the C++ programming language that conform with the Component Object Model ("COM"). COM is a specification that describes a standard interface that allows objects developed in conformance with the specification to interoperate. COM is defined in "Inside OLE: Second Edition," by Kraig Brockschmidt and published by Microsoft Press in 1995, which is hereby incorporated by reference. Java programs are translated by an interpreter referred to as a Java Virtual Machine ("Java VM"). The custom marshaling system automatically generates Java prototypes from the COM prototypes and vice versa. The mappings from COM prototypes to Java prototypes are described below in detail. The Java VM inputs statements of a Java program and performs the behavior associated with the statements. When the Java VM encounters an inter-language invocation (i.e., from the Java program to a COM function, that is, a function implemented in the C++ programming language that conforms with COM), the Java VM determines whether custom marshaling has been defined for any of the parameters. If custom marshaling code has been defined for a parameter, then the Java VM loads and executes the marshaling code before and after invoking the function.

TABLE 1

| COM Prototype | Java Prototype |
|---|---|
| Foo ([in] COMTYPE) | Foo (JAVATYPE) |
| Foo ([out,retval] COMTYPE*) | JAVATYPE Foo( ) |
| Foo ([in] COMTYPE*) | Foo (JAVATYPE) |
| Foo ([out] COMTYPE*) | Foo (JAVATYPE)* |
| Foo ([in,out] COMTYPE*) | Foo (JAVATYPE)* |
| Foo ([out,retval] COMTYPE**) | JAVATYPE Foo ( ) |
| Foo ([in] COMTYPE**) | Foo (JAVATYPE[ ]) |
| Foo ([out] COMTYPE**) | Foo (JAVATYPE[ ]) |
| Foo ([in,out] COMTYPE**) | Foo (JAVATYPE[ ]) |

*If the JAVATYPE is immutable, then the JAVATYPE is passed as an array so that a value can be returned. Immutability of a parameter type can be specified when the custom marshaling code is identified to the custom marshaling system.

Table 1 illustrates the mapping of the COM prototypes to the Java prototype. The custom marshaling system generates Java prototypes based on the direction in which the parameter is to be passed (e.g., [in] and [out]), whether the parameter is passed in by single or double indirection. In the following, "JAVATYPE" refers to the type of the Java parameter, "COMTYPE" refers to the type of the COM parameter, and "Foo" refers to the function to be invoked. Unless specified otherwise, JAVATYPE is the type of an object, and the object is passed by reference. As shown in Table 1, when the COMTYPE specifies double indirection, then the JAVATYPE is an array to effect the double indirection.

Figure 1:
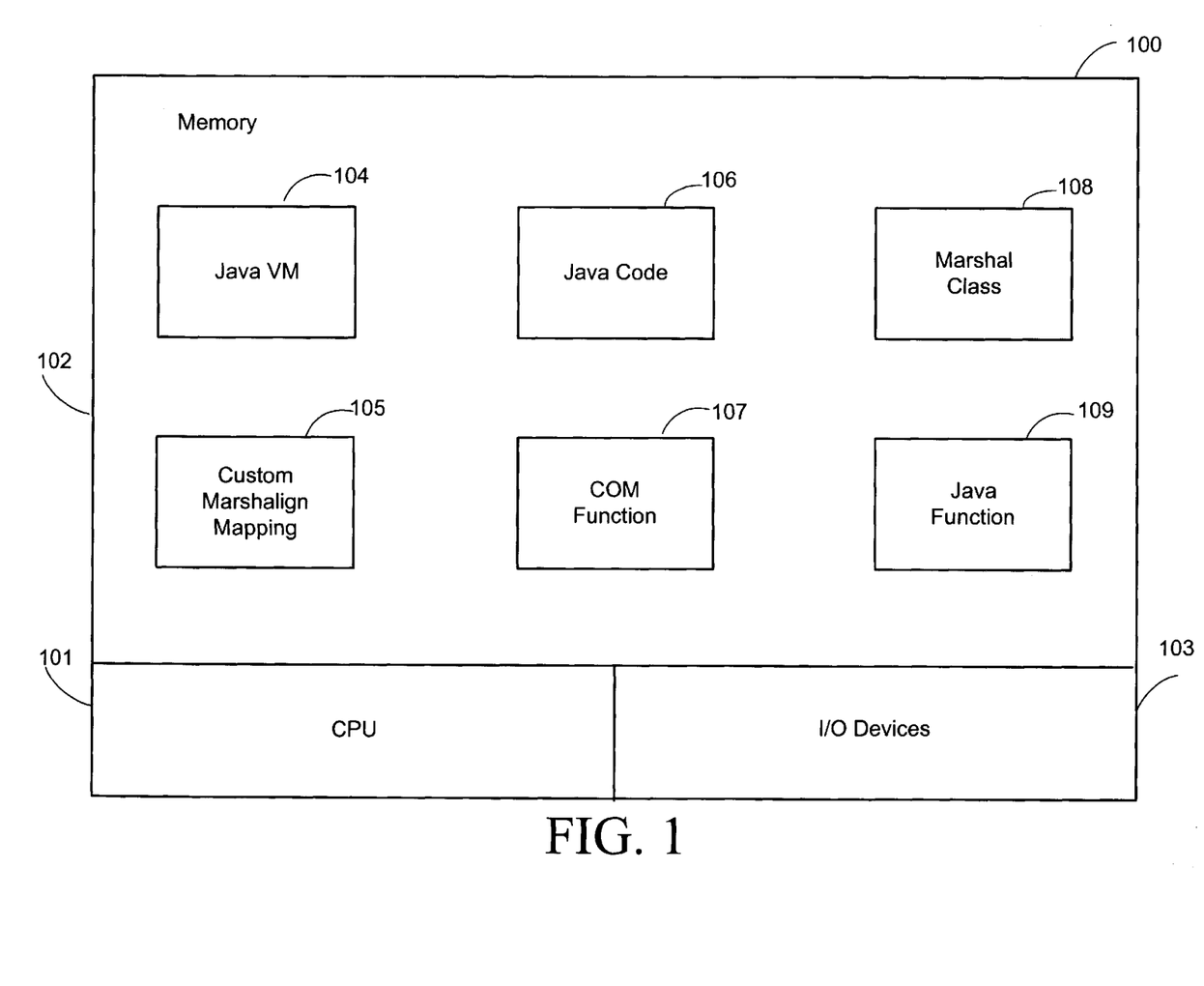
FIG. 1 is a block diagram illustrating components of a computer system upon which the custom marshaling system may be implemented.

FIG. 1 is a block diagram illustrating components of a computer system upon which the custom marshaling system may be implemented. The computer system 100 includes a central processing unit 101, memory 102, and I/O devices 103. The memory contains a Java VM 104, a custom marshaling map 105, Java code 106, COM functions 107, marshaling classes 108, and Java functions 109. The custom marshaling map contains a mapping from the Java data types to COM data types, identifies the marshal classes that defines the marshaling code, and indicates whether the JAVATYPE is immutable. The marshaling classes are provided by a programmer and define the custom marshaling code. The Java VM loads and executes the Java program, which invokes a COM function. A COM function in turn may invoke a Java function. The parameters passed by the COM function may also need to be converted. Therefore, the marshal classes define various methods for converting to and from JAVATYPE and COMTYPE. The methods of the marshaling classes perform appropriate converting of data types and allocating and deallocating of memory as needed. The following lists various methods of the marshaling classes and description of the behavior of each method. The methods toJava, toUninitJava, toExternal, and toUninitExternal create new instances of the parameters. The methods copyToJava and copyToExternal propagate their converted values to existing instances.

JAVATYPE toJava (COMTYPE ppCOMPTYPE)

This method creates an instance of JAVATYPE, converts the COMTYPE parameter pointed to by ppCOMTYPE to a JAVATYPE and returns the JAVATYPE instance set to the converted value as the return value of the method. This method is used when a COM program is passing an [in] parameter to invoke a Java function or when a COM function is returning a [retval] parameter to a Java program. This method creates an initialized JAVATYPE instance that is passed to a Java program or function.

VOID copyToJava (JAVATYPE valueJAVATYPE, COMPTYPE ppCOMTYPE)

This method converts the COMTYPE parameter pointed to by ppCOMTYPE to a JAVATYPE and stores the converted value in the parameter valueJAVATYPE. This method is used when returning an [out] parameter to a Java program from an invoked COM function. This method is used to change the value of an existing actual parameter in the Java program; this method does not create a new instance of JAVATYPE.

JAVATYPE toUninitJava (COMPTYPE ppCOMTYPE)

This method creates an uninitialized JAVATYPE instance and returns it as the return parameter. This method is used when a COM program is passing an [out] parameter to a Java function. The unitialized JAVATYPE instance is passed to the Java function.

VOID copyToExternal (JAVATYPE valueJAVATYPE, COMTYPE ppCOMTYPE)

This method converts the JAVATYPE parameter to a COMTYPE and stores the converted value in ppCOMTYPE. This method is used when a Java program passes a parameter to a COM function or when a Java function returns an [out] parameter to a COM program. This method is used to change the value of an existing actual parameter; this method does not create a new instance of a COMTYPE. This method is invoked, for example, when an instance of the COMTYPE parameter is allocated in the stack.

VOID relcascByValExternal (COMTYPE ppCOMTYPE)

This method releases resources used by the COMTYPE parameter, but this method does not release the instance. This method is invoked, for example, when the instance is allocated on the stack. This method is used when a COM function returns to a Java program and the COM parameter had a size designated by the marshaling code.

VOID toExternal (JAVATYPE valueJAVATYPE, COMTYPE ppCOMTYPE)

This method creates a new instance of COMTYPE, converts the valueJAVATYPE to a COMTYPE, and stores the converted value as the new COMTYPE instance. This method is used when a Java function returns a return value to a COM program.

VOID releaseExternal (COMTYPE ppCOMTYPE)

This method releases resources used by the COMTYPE parameter and releases the instance of the parameter. The method is used when a Java program invokes a COM function and the COM function expects an [out] parameter. This method is used in conjunction with the toExternal and toUninitExternal methods.

VOID toUninitExternal (JAVATYPE value JAVATYPE)

This method creates a new instance of COMTYPE. This method is used when a JAVA program invokes a COM function that has an [out] parameter.

Tables 2–5 contain various marshaling sequences used with custom marshaling of paraneters. Each table contains two subtables. The first subtable indicates the sequence when a Java program invokes a COM function, and the second subtable indicates the sequence when a COM program invokes a Java function.

Table 2 lists marshaling sequences when the COMTYPE is passed by reference and the JAVATYPE is mutable. Each subtable contains four rows indicating the code execution sequences for the direction (i.e., [in], [out], [in,out], and [out,retval]) that the parameter passed to the COM function. Also, the subtables contain "preferred" and "alternate" sequences. In this table, if the marshaling class exports a "ByValSize" variable and a copyToExternal method, then the preferred sequence is used. If the "ByValSize" variable is exported, then custom marshaling system can allocate the variable of that size on the stack. The example COM finction is named "Foo," and the example Java function is named "foo." For example, the preferred marshaling sequence when a Java Program invokes a COM function and passes an [in,out] parameter is copyToExternal Foo copyToJava releaseByValExternal When this Java VM detects such an invocation, the Java VM allocates space on the stack for the parameter (i.e., "ByValSize" number of bytes) and then invokes the copyToExternal method. This method converts the JAVATYPE to a COMTYPE and copies the converted value to the allocated space on the stack. The Java VM then invokes the COM function Foo. On return, the Java VM invokes the copyToJava method to convert the COMTYPE returned on the stack to a JAVATYPE and stores the converted value in the JAV- ATYPE parameter passed by the Java program. The Java VM then invokes the releaseByValExternal method to perform any cleanup needed by the COMTYPE. The Java VM then deallocates the space on the stack and returns the Java program.

When a COM program invokes a Java function and passes an [in,out] parameter, the marshaling sequence as indicated by Table 2 is     toJava
    releaseByValExternal
    foo
    copyToExternal The Java function has a COM wrapper function which the COM program invokes. When the COM wrapper function is invoked, it performs this marshaling sequence. The COM wrapper function first calls the toJava method to convert the COMTYPE to a JAVATYPE and return the JAVATYPE as the return value of the function. The COM wrapper function then invokes the releaseByValExternal method to perform any clean up for the COMTYPE parameter. The COM wrapper function then invokes the Java function foo passing the JAVATYPE parameter. When the Java function returns, the COM wrapper function invokes the copyToExternal method to convert the JAVATYPE to a COMTYPE and to store the converted value as the [out] parameter on the stack. The COM wrapper function then returns to the COM function.

TABLE 2

| C prototype Foo(COMTYPE*) | | Java prototype foo(JAVATYPE) |
|---|---|---|
| Direction | Preferred | Alternate |
| Java invokes COM | | |
| [IN] | copyToExternal<br>Foo<br>releaseByValExternal | toExternal<br>Foo<br>releaseExternal |
| [OUT] | Foo<br>copyToJava<br>releaseByValExternal | Foo<br>toUninitExternal<br>copyToJava<br>releaseExternal |
| [IN,OUT] | copyToExternal<br>Foo<br>copyToJava<br>releaseByValExternal | toExternal<br>Foo<br>copyToJava<br>releaseExternal |
| [OUT,RETVAL] | Foo<br>toJava<br>releaseExternal | |
| COM invokes Java | | |
| [IN] | toJava<br>foo | |
| [OUT] | toUninitJava<br>foo<br>copyToExternal | |
| [IN,OUT] | toJava<br>releaseByValExternal<br>foo<br>copyToExternal | |
| [OUT,RETVAL] | Foo<br>toExternal | |

Table 3 lists marshaling sequences when the COMTYPE is passed by reference and the JAVATYPE is immutable. In such a situation, the JAVATYPE parameter is passed as an array, so that it can be modified. The preferred marshaling sequence for an [in,out] parameter when a Java program invokes a COM program is     copyToExternal
    Foo
    toJava
    releaseByValExternal.

The sequence is similar to the corresponding sequence of Table 2, except that the toJava method is invoked rather than the copyToJava method. The toJava method creates a new JAVATYPE instance, rather than modifying an existing JAVATYPE instance. This allows the newly created variable to be returned through the array mechanism.

TABLE 3

| C prototype Foo(COMTYPE*) | | Java prototype foo(JAVATYPE[]) |
|---|---|---|
| Marshaling Direction | Preferred | Alternate |
| Java invokes COM | | |
| [IN] | copyToExternal<br>Foo<br>releaseByValExternal | toExternal<br>Foo<br>releaseExternal |
| [OUT] | Foo<br>toJava<br>releaseByValExternal | toUninitExternal<br>Foo<br>toJava<br>releaseExternal |
| [IN,OUT] | copyToExternal<br>Foo<br>toJava<br>releaseByValExternal | toExternal<br>Foo<br>toJava<br>releaseExternal |
| COM invokes Java | | |
| [IN] | toJava<br>foo | |
| [OUT] | foo<br>copyToExternal | |
| [IN,OUT] | toJava<br>releaseByValExternal<br>foo<br>copyToExternal | |

Table 4 lists marshaling sequences when the COM parameters are passed by value. The marshaling sequence when a Java program invokes a COM function passing an [in] parameter is     copyToExternal
    Foo
    releaseByValExternal The COMTYPE parameter that is passed to the copyToExternal method is allocated in the stack.

TABLE 4

| C prototype Foo(COMTYPE) | | Java prototype foo(JAVATYPE) |
|---|---|---|
| Marshaling Direction | Preferred | Alternate |
| Java invokes COM | | |
| [IN] | copyToExternal<br>Foo<br>releaseByValExternal | |
| [OUT,RETVAL] | Foo<br>toJava<br>releaseByValExternal | |
| COM invokes Java | | |
| [IN] | toJava<br>foo | |
| [OUT,RETVAL] | foo<br>copyToExternal | |

Table 5 lists marshaling sequences used when the parameter is designated as being passed by reference via double indirection. The marshaling sequence when a Java program invokes a COM function passing an [in] parameter is copyToExternal
Foo
releaseByValExternal.

TABLE 5

| C prototype Foo(COMTYPE**) | Java prototype foo(JAVATYPE[]) | |
|---|---|---|
| Marshaling Direction | Preferred | Alternate |
| Java invokes COM | | |
| [IN] | toExternal Foo releaseExternal | |
| [OUT] | Foo toJava releaseExternal | |
| [IN,OUT] | toExternal Foo toJava releaseExternal | |
| COM invokes Java | | |
| [IN] | toJava Foo | |
| [OUT] | Foo toExternal | |
| [IN,OUT] | toJava releaseExternal Foo toExternal | |

Figure 2:
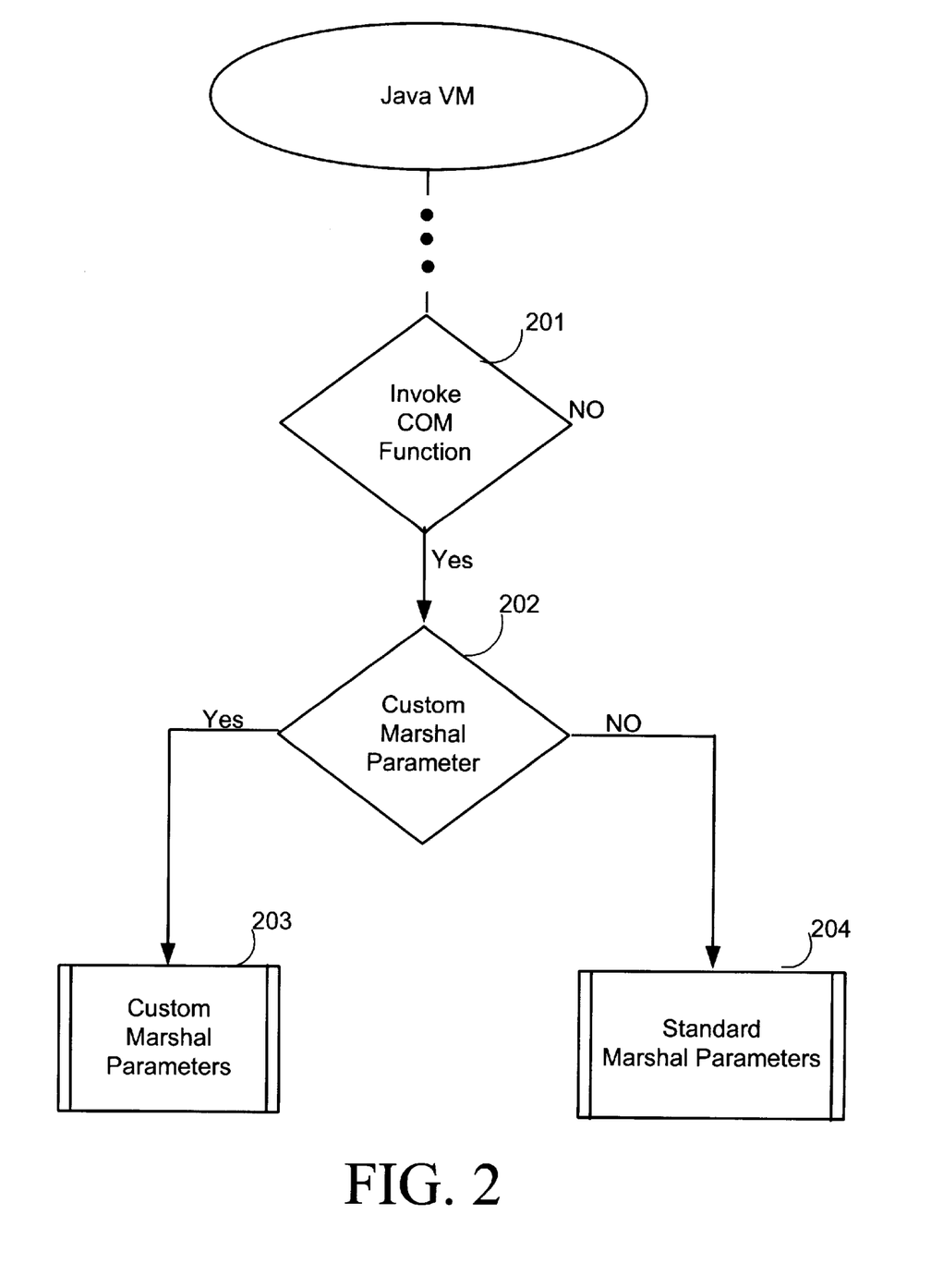
FIG. 2 is a flow diagram illustrating the processing of the Java VM when it encounters an invocation to a COM function.

FIG. 2 is a flow diagram illustrating the processing of the Java VM when it encounters an invocation to a COM function. In step 201, if the Java instruction currently being processed indicates to invoke a COM function, then the Java VM continues at step 202, else the Java VM continues with its normal processing. In step 202, if custom marshaling has been defined for a parameter, then the Java VM continues at step 203, else the Java VM continues at step 204. In step 203, the Java VM invokes a routine to perform custom marshaling of the parameters and then the Java VM continues its normal processing. In step 204, the Java VM invokes a routine to perform standard marshaling of the parameters and then the Java VM continues its normal processing.

Figure 3:
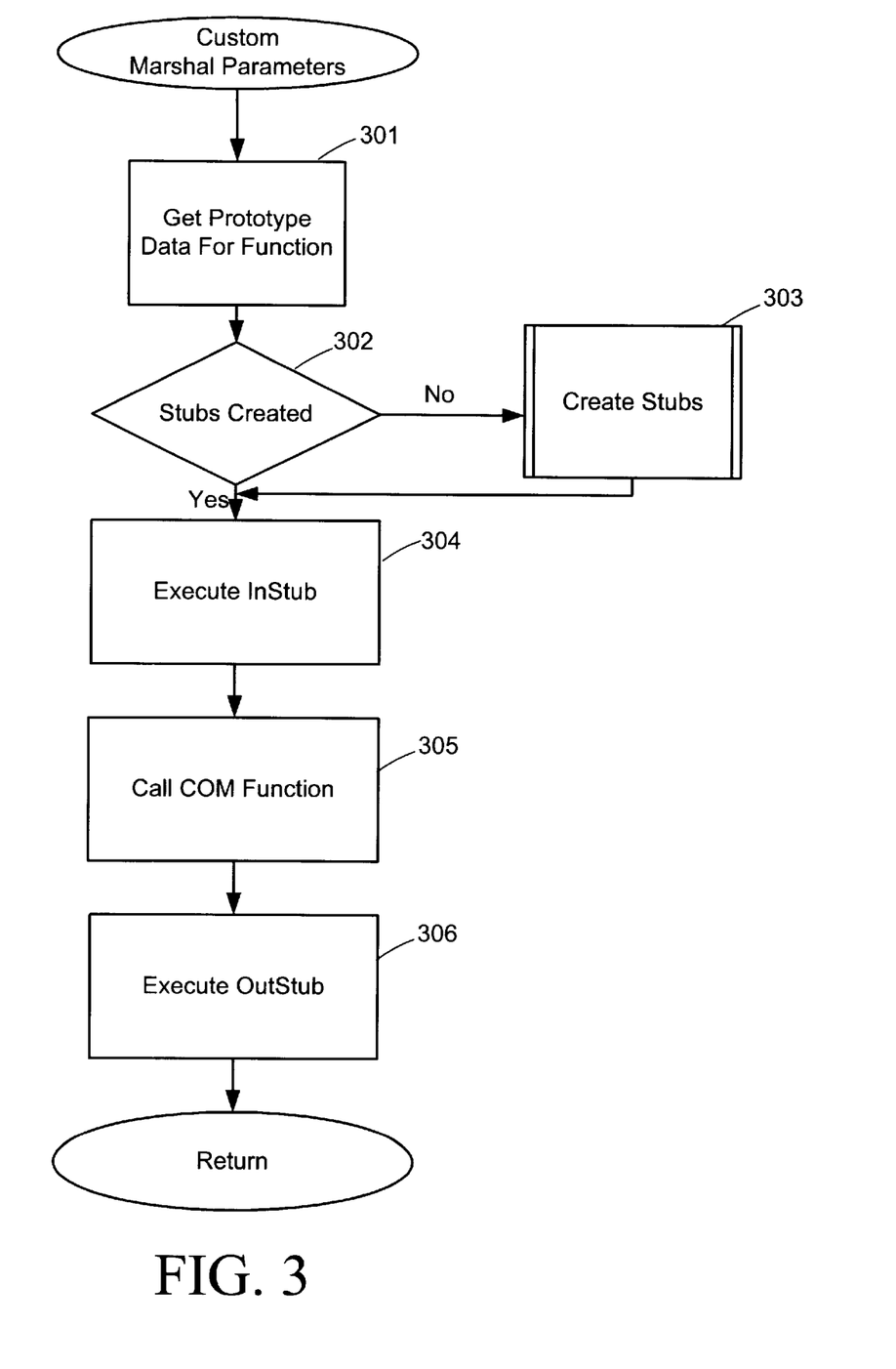
FIG. 3 is a flow diagram of the routine to custom marshal the parameters.

FIG. 3 is a flow diagram of the routine to custom marshal the parameters. In step 301, the routine retrieves information from the parameter to be custom marshaled. In step 302, if stubs have already been created for this parameter, then the routine continues at step 304, else the routine continues at step 303. In step 303, the routine invokes a subroutine to create the stubs (an in stub and an out stub) to control the marshaling. In step 304, the routine executes the in stub for the parameters. In step 305, the routine invokes the COM function. In step 306, the routine executes the out stub for this COM function and returns.

Figure 4:
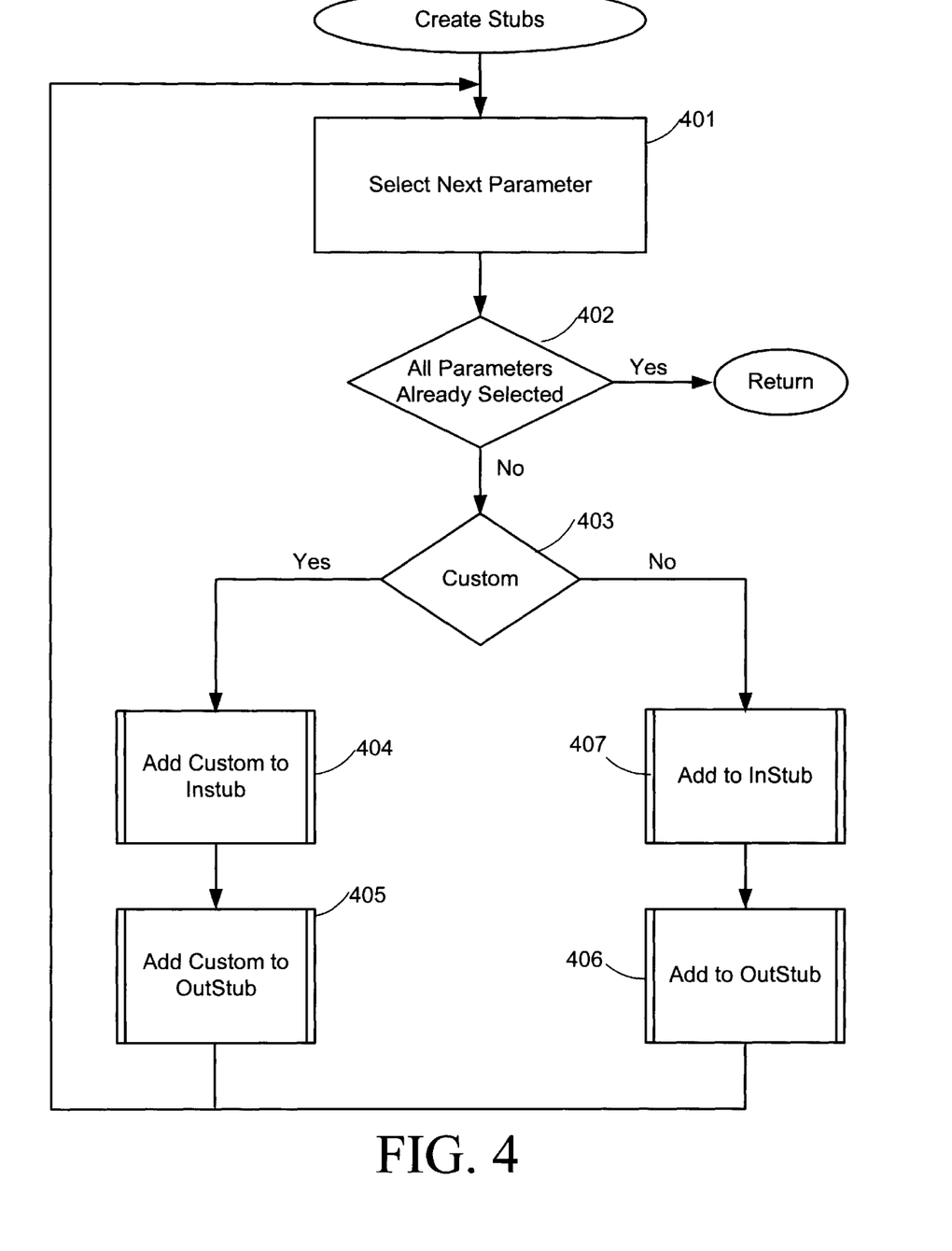
FIG. 4 is a flow diagram of a subroutine that creates the in stub and the out stub.

FIG. 4 is a flow diagram of a subroutine that creates the in stub and the out stub. In steps 401–407, the subroutine loops selecting each of the parameters that are to be passed. In step 401, the routine selects the next parameter starting with the first. In step 402, if all the parameters have already been selected, then the subroutine returns, else the subroutine continues at step 403. In step 403, if the selected parameter is to be custom marshaled, then the subroutine continues at step 404, else the subroutine continues at step 406. In step 404, the routine adds the custom marshaling code to marshal the selected parameter to the in stub. In step 405, the routine adds the custom code to marshal back the selected parameter to the out stub and loops to step 401 to select the next parameter. In step 406, the routine adds code to pass the parameter to the in stub. In step 407, the routine adds code to return the parameter to the out stub and loops to step 401 to select the next parameter.

Figure 5:
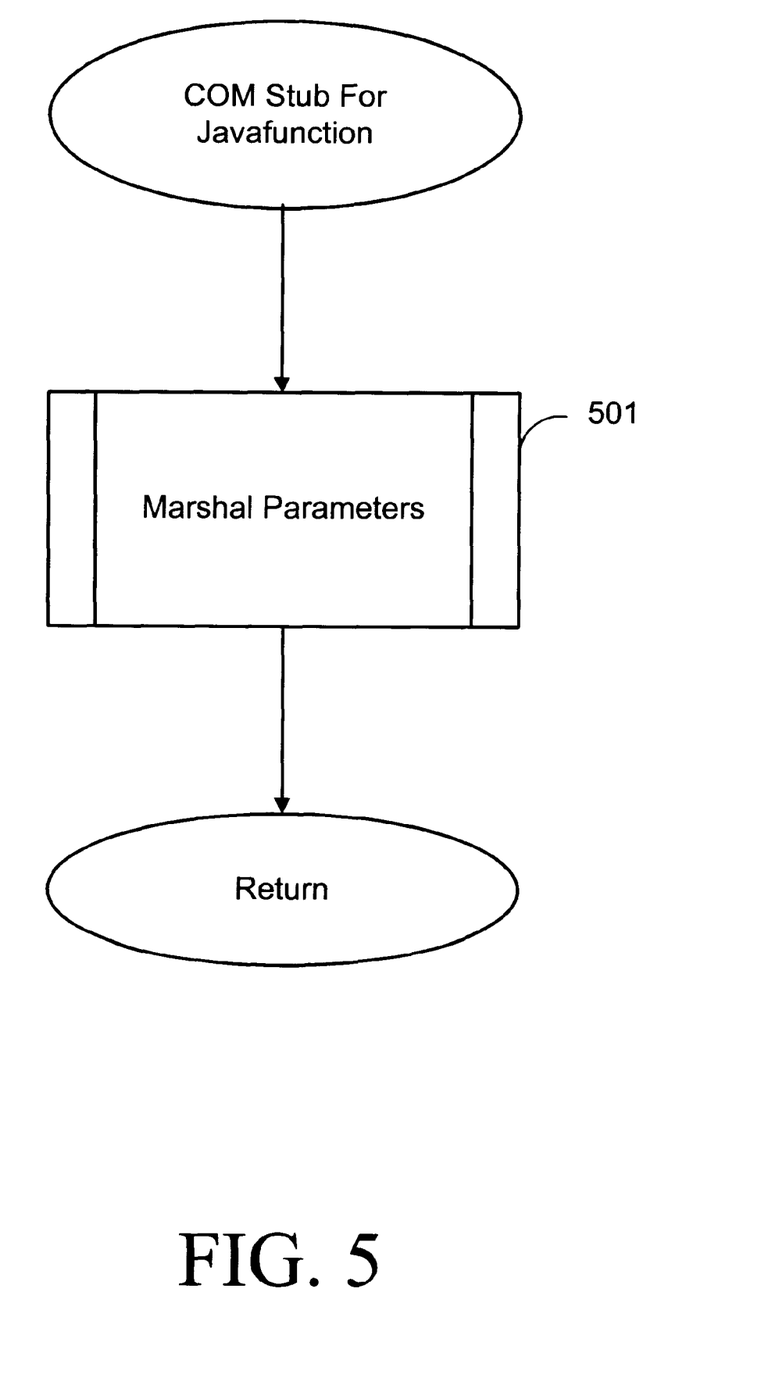
FIG. 5 is a flow diagram of a COM wrapper function for a Java function.

FIG. 5 is a flow diagram of a COM wrapper function for a Java function. When code implemented in COM invokes a Java function, this COM stub is invoked. In step 501, the wrapper function marshals the parameter from the COM to the Java and returns.

The following lists sample pseudocode implementation of marshaling classes. Code Table 1 lists the methods of a marshaling class for marshaling a JAVATYPE of double to a COMTYPE of "Fixed." The JAVATYPE of double is a primitive type in Java and is therefore immutable.

CODE TABLE 1

```
struct FIXED {
    WORD    fract;
    short   value;
} FIXED;
public FixedPtMarshaler {
    public static int cbByValSize; // set of sizeof(FIXED) = 8
    public static double toJava(int ppFIXED, int flags)
    {
    // convert **ppFIXED to a double
    // return the double
    }
    public static void copyToExternal(double javaval,
                                    int     ppFIXED,
                                    int     Flags)
    {
    // convert double to a FIXED
    // copy the FIXED to **ppFIXED
    }
}
```

Code table 2 lists the pseudocode methods of a marshaling class for marshaling a JAVATYPE of string to a COMTYPE of "variant." The lo JAVATYPE of string is a primitive type in Java and is therefore immutable. The releaseByValExternal allows deallocation of resources for a parameter that was allocated in the stack.

CODE TABLE 2

```
struct {
    short vt;        // Always VT_BSTR for this example
    short unused;
    short unused1;
    short unused2;
    BSTR bstrVal;    // Points to characters in BSTR
    long unused3;    // never used in this example.
} VARIANT;
public VarStrMarshaler {
    public static int cbByValSize;  // set of sizeof(VARIANT) = 16
    public static String toJava(int ppVARIANT, int flags)
    {
       // convert **ppVARIANT to a String
       // return the String
    }
    public static void copyToExternal(String javaval,
                                    int      ppVARIANT,
                                    int      Flags)
    {
       // convert String to a VARIANT
       // copy the VARIANT to **ppVARIANT
    }
    public static void releaseByValExternal(int ppVARIANT, int Flags)
```

CODE TABLE 2

```
{
    SysStringFree( (*ppVARIANT) − >bstrVal );
  }
}
```

Code Table 3 lists pseudocode for methods of a marshaling class for marshaling a JAVATYPE of point object to a COMTYPE of point. The point object is mutable in Java. The copyToJava and to Uninitjava methods allows mutable objects to be passed using the non-array form.

CODE TABLE 3

```
{                         //JAVATYPE
    double ad1[ ] = {0};
    double ad2[ ] = {0};
    func(ad1, ad2);
    System.out.println("func gave back: " + ad1[0] + ", " + ad1[1]);
}
public PointMarshaler {
    public static int cbByValSize; // set of sizeof(POINT) = 8
    public static Point toJava(int ppPOINT, int flags)
    {
        // convert **ppPOINT to a Point
        // return the Point
    }
    public static void copyToExternal(Point javaval,
                            int     ppPOINT,
                            int     Flags)
    {
        // convert Point to a POINT
        // copy the POINT to **ppPOINT
    }
    public static void copyToJava(Point javaval, int ppPOINT, int Flags)
    {
        // modify "javaval" in place so it is "equivalent" to **ppPOINT;
    }
    public static Point toUninitJava(int ppPOINT, int flags)
    {
        // create a new Point with arbitrary x and y values.
        // the contents of **ppPOINT are completely undefined and
        // should be ignored for fixed-size hook classes.
    }
}
```

Code Table 4 lists pseudocode for methods of a marshaling class for marshaling when a COMTYPE needs to allocate and deallocate memory other than on the stack.

CODE TABLE 4

```
public RectMarshaler {
    public static int cbByValSize; // set of sizeof(RECT) = 8
    public static Rect toJava(int ppRECT, int flags)
    {
        \\ convert **ppRECT to a Rect
        \\ return the Rect
    }
    public static void copyToExternal(Rect javaval,
                            int     ppRECT,
                            int     Flags)
    {
        \\ convert Rect to a RECT
        \\ copy the RECT to **ppRECT
    }
    public static void toExternal(Rect javaval, int ppRECT, int Flags)
    {
```

CODE TABLE 4

```
        \\ allocate a new RECT, initialize it using javaval,
        \\ store pointer in *ppRECT
    }
    public static void releaseExternal(int ppRECT, int Flags)
    {
        \\ release *ppRECT. If RECT required a releaseByValExternal
        \\ (which it doesn't), this routine must do that work as well.
    }
}
```

Code Table 5 lists pseudocode for methods of a marshaling class for marshaling when the COMTYPE is of variable size.

CODE TABLE 5

```
public AnsiMarshaler {
    public static String toJava(int ppCHAR, int flags)
    {
        // convert **ppCHAR to a String
        // return the String
    }
    public static void toExternal(String javaval, int ppCHAR, int Flags)
    {
        // allocate a new LPSTR, initialize it using javaval,
        // store pointer in *ppCHAR
    }
    public static void releaseExternal(int ppCHAR, int Flags)
    {
        // release *ppCHAR. If LPSTR required a
        // releaseByValExternal (which it doesn't), this routine
        // must do that work as well.
    }
}
```

From the foregoing it will be appreciated that, although specific embodiments of the invention have been described herein for purposes of illustration, various modifications may be made without deviating from the spirit and scope of the invention. For example, one skilled in the art would appreciate that the techniques of the present invention can be used to interface with programs developed in any programming language that conforms with COM. Moreover, the techniques may be generally applicable to the marshaling of parameters between programs developed in various programming languages. Accordingly, the invention is not limited except as by the appended claims.

What is claimed is:

1. A method in a computer system for marshaling of parameters during invocation of functions implemented in a second language by computer programs implemented in an first language, a parameter to be marshaled having a first type in the first language and a second type in the second language, the method comprising:

executing a computer program implemented in the first language that invokes a function implemented in the second language, the invocation passing a parameter of the first type and the function expecting a parameter of the second type;

intercepting the invocation of the function implemented in the second language; and after intercepting the invocation, determnining that the passed parameter requires custom marshaling;

creating for the invoked function an in stub that invokes custom marshaling code for converting the passed parameter of the first type to a parameter of the second type and an out stub that invokes custom marshaling code for converting a returned parameter of the second type to a parameter of the first type;

executing the in stub, thereby converting the passed parameter of the first type to a parameter of the second type;

invoking the function implemented in the second language and passing the parameter converted to the second type, the invoked function returning a parameter of the second type;

after invocation of the function, executing the out stub, thereby converting the returned parameter of the second type to a parameter of the first type; and returning the converted parameter of the first type when returning from the intercepted invocation of the function.

2. The method of claim 1 wherein the custom marshaling code is a custom marshaling class with member functions for converting the parameters.

3. The method of claim 1 wherein the first language is a Java-based language and the second language is a C-based language.

4. The method of claim 1 wherein the custom marshaling code may be for converting any arbitrary first and second types.

5. A method in a computer system for marshaling of a parameter for inter-language invocation of functions between a first language and a second language, the parameter to be marshaled having a first type in the first language and a second type in the second language, the method comprising:

when a computer program implemented in the first language invokes a function implemented in the second language, determining that a parameter being passed to the function requires custom marshaling;

creating for the invoked function an in stub that invokes custom marshaling code for converting the passed parameter of the first type to a parameter of the second type and an out stub that invokes custom marshaling code for converting a returned parameter of the second type to a parameter of the first type;

executing the in stub, thereby converting the passed parameter of the first type to a parameter of the second type;

invoking the function implemented in the second language and passing the parameter converted to the second type; and after invocation of the function, executing the out stub, thereby converting the parameter of the second type to a parameter of the first type.

6. The method of claim 5 wherein the first language is the Java programming language.

7. The method of claim 5 wherein the first language is the C++ programming language.

8. The method of claim 5 wherein the custom marshaling code is implemented as member functions of a class.

9. The method of claim 5 wherein the custom marshaling code includes an indication of the size of a parameter of the second type.

10. The method of claim 5 wherein before invoking the function implemented in the second language, the parameter of the second type is allocated on a stack.

11. The method of claim 5 wherein the custom marshaling code for converting includes code for releasing allocated memory.

12. The method of claim 5 wherein the custom marshaling code is capable of converting arbitrary types of data.

13. A computer system for marshaling of a parameter for inter-language invocation of functions between a first language and a second language, the parameter to be marshaled having a type in the first language and another type in the second language, comprising:

a storage component containing custom marshaling code for converting parameters of certain types to parameters of other types and for converting the parameters of the other types to parameters of the certain types;

a component for receiving custom marshaling code and adding the received code to the storage component; and a marshaling component that when a computer program implemented in the first language invokes a function implemented in the second language, creates an in stub and an out stub;

retrieves the custom marshaling code for converting the parameter based on the type of the parameter in the first and second languages and includes the code within the in stub and the out stub, executes the in stub, thereby converting the passed parameter of a first type to a parameter of a second type, invokes the function implemented in the second language passing the parameter converted to the second type, and after invocation of the function, executes the out stub, thereby converting the parameter of the second type to a parameter of the first type.

14. The system of claim 13 wherein the first language is the Java programming language.

15. The system of claim 13 wherein the first language is the C++ programming language.

16. The system of claim 13 wherein the received code is implemented as member functions of a class.

17. A computer-readable medium containing instructions for causing a computer system to marshal a parameter for inter-language invocation of functions between a first language and a second language, the parameter to be marshaled having a first type in the first language and a second type in the second language, by:

when a computer program implemented in the first language invokes a function implemented in the second language, determining that a parameter being passed to the function requires custom marshaling;

creating for the invoked function an in stub that invokes custom marshaling code for converting the passed parameter of the first type to a parameter of the second type and an out stub that invokes custom marshaling code for converting a returned parameter of the second type to a parameter of the first type;

executing the in stub, thereby converting the passed parameter of the first type to a parameter of the second type; and invoking the function implemented in the second language and passing the parameter converted to the second type.

18. The computer-readable medium of claim 17 wherein the first language is the Java programming language.

19. The computer-readable medium of claim 17 wherein the first language is the C++ programming language.

* * * * *

UNITED STATES PATENT AND TRADEMARK OFFICE
CERTIFICATE OF CORRECTION

PATENT NO. : 6,167,565
DATED : December 26, 2000
INVENTOR(S) : Atsushi Kanamori

It is certified that error appears in the above-identified patent and that said Letters Patent is hereby corrected as shown below:

Title page, Under Other Publications,
Error reads ".comjava" should read -- .com/java --
Error reads "jnativeType" should read -- jnative/Type --
Error reads "mirosoft" should read -- microsoft --

Title page,
under Abstract, error reads "an" should read -- a --

Column 2,
Line 3, error reads "of stack" should read -- of the stack --
Line 41, error reads "itself Thus" should read -- itself. Thus --

Column 5,
Line 33, error reads "toExtemal" should read -- toExternal --
Line 62, error reads "unitialized" should read -- unitialized --

Column 6,
Line 35, error reads "paraneters" should read -- parameters --
Line 48, error reads "then custom" should read -- then the custom --
Line 50, error reads "finction" should read -- function --

Column 8,
Lines 44-45, error reads "copyTo Extemal" should read -- copyTo External --

Column 10,
Line 10, error reads "The lo JAVATYPE" should read -- The JAVATYPE --

UNITED STATES PATENT AND TRADEMARK OFFICE
CERTIFICATE OF CORRECTION

PATENT NO. : 6,167,565
DATED : December 26, 2000
INVENTOR(S) : Atsushi Kanamori

It is certified that error appears in the above-identified patent and that said Letters Patent is hereby corrected as shown below:

Column 12,
Line 52, error reads "in an" should read -- in a --

Signed and Sealed this

Thirtieth Day of October, 2001

Attest:

*Nicholas P. Godici*

NICHOLAS P. GODICI
*Attesting Officer*   *Acting Director of the United States Patent and Trademark Office*